United States Patent [19]

Kress et al.

[11] Patent Number: 4,925,891

[45] Date of Patent: * May 15, 1990

[54] HIGH IMPACT STRENGTH FLAME-RETARDANT POLYCARBONATE MOULDING COMPOSITIONS

[75] Inventors: Hans-Jürgen Kress, Pittsburgh, Pa.; Christian Lindner, Cologne, Fed. Rep. of Germany; Friedemann Müller, Neuss, Fed. Rep. of Germany; Horst Peters, Leverkusen, Fed. Rep. of Germany; Dieter Wittmann; Josef Buekers, both of Krefeld,, Fed. Rep. of Germany

[73] Assignee: Bayer Aktiengesellschaft, Leverkusen, Fed. Rep. of Germany

[*] Notice: The portion of the term of this patent subsequent to Sep. 8, 2004 has been disclaimed.

[21] Appl. No.: 331,064

[22] Filed: Mar. 28, 1989

Related U.S. Application Data

[63] Continuation of Ser. No. 86,687, Aug. 18, 1987, abandoned.

[30] Foreign Application Priority Data

Aug. 26, 1986 [DE] Fed. Rep. of Germany ....... 3628904

[51] Int. Cl.$^5$ .................. C08K 5/52; C08K 5/53
[52] U.S. Cl. ................. 524/139; 524/141; 524/411; 524/412
[58] Field of Search .............. 525/92, 101, 85; 524/411, 412, 141, 139

[56] References Cited

U.S. PATENT DOCUMENTS

| | | | |
|---|---|---|---|
| 4,463,130 | 7/1984 | Serini et al. | 525/147 |
| 4,464,487 | 8/1984 | Thomas et al. | 525/147 |
| 4,569,970 | 2/1986 | Paul et al. | 524/92 |
| 4,692,488 | 9/1987 | Kress et al. | 524/139 |
| 4,751,260 | 6/1988 | Kress et al. | 524/141 |

*Primary Examiner*—Veronica P. Hoke
*Attorney, Agent, or Firm*—Connolly and Hutz

[57] ABSTRACT

The present invention relates to high impact strength flame-retardant polycarbonate moulding compositions, which are characterized in that they consist of halogen-free polydiorganosiloxane-polycarbonate block copolymers, halogen-free copolymers, halogen-free phosphorus compounds, tetrafluoroethylene polymers and, if appropriate, stabilizers, pigments, flow control agents, mould release agents and/or antistatics, and to processes for their preparation.

17 Claims, No Drawings

HIGH IMPACT STRENGTH FLAME-RETARDANT POLYCARBONATE MOULDING COMPOSITIONS

This application is a continuation of application Ser. No. 086,687, filed Aug. 18, 1987 now abandoned.

The present invention relates to high impact strength flame-retardant polycarbonate moulding compositions consisting of (A) 60 to 90 parts by weight of a halogen-free polydiorganosiloxane-polycarbonate block copolymer with an average molecular weight $\overline{M}_w$ (weight average) of 10,000 to 200,000 and with a content of aromatic carbonate structural units of between 75 and 99% by weight, preferably between 75 and 97.5% by weight, and a content of diorganosiloxane units of between 25 and 1.0% by weight, preferably between 25 and 2.5% by weight, the block copolymers being prepared starting from polydiorganosiloxanes which contain α,ω-bishydroxyaryloxy end groups and have a degree of polymerization $\overline{P}_n$ of 5 to 100, preferably of 20 to 80, (B) 10 to 40 parts by weight of a halogen-free thermoplastic copolymer of 50 to 95% by weight of styrene, α-methylstyrene, nuclear-substituted styrene or mixtures thereof and 5 to 50% by weight of (meth)acrylonitrile, (C) 1 to 20 parts by weight, preferably 2 to 15 parts by weight, per 100 parts by weight of the total weight of (A) and (B), of a halogen-free phosphorus compound of the formula (I);

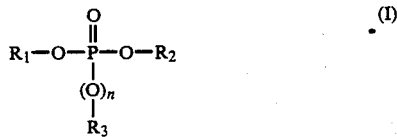

wherein
$R_1$, $R_2$ and $R_3$ independently of one another are $C_1$-$C_8$-alkyl or optionally alkyl-substituted $C_6$-$C_{20}$-aryl and
"n" represents 0 or 1, and (D) 0.05 to 5 parts by weight, again per 100 parts by weight of the total weight of (A) and (B), and in particular 0.1 to 2 parts by weight, of a tetrafluoroethylene polymer with a density of 2.0 to 2.3 g/cm³ and a particle size of 100 to 1,000 μm, and, if appropriate, effective amounts of stabilizers, pigments, flow control agents, mould release agents and/or antistatics.

Component (A) can also be a mixture of polydiorganosiloxane-polycarbonate block copolymers with other siloxane-free thermoplastic halogen-free polycarbonates, the total content of diorganosiloxy units in the polycarbonate mixture in turn being between 1 and 25% by weight, preferably between 2.5 and 25% by weight.

According to DE-OS (German Published Specification) 2,228,072, thermoplastic polycarbonates are rendered flame-retardant with a mixture of hexabromobenzene and an antimony compound, and can additionally contain a phosphate ester as a synergistic agent. The sole addition of 10 parts by weight of triphenyl phosphate to bisphenol A polycarbonate, however, has no anti-drip action in accordance with the ignition test of U.L. Subj. 94 (see page 20 of DE-OS (German Published Specification) 2,228,072).

British Patent Specification 1,459,648 describes flame-retardant, non-dripping polymers, for example of ABS polymers or of plycarbonates, to which a flameproofing additive, such as, for example, triphenyl phosphate, a non-combustible fibre material and polytetrafluoroethylene resin have been admixed. Example 2 of British Patent Specification 1,459,648 shows that polytetrafluoroethylene resin does not prevent dripping without the fibre additive.

Thermoplastics which can be foamed are known from DE-OS (German Published Specification) 2,434,085, polycarbonates, polymers or mixtures thereof, inter alia, being mentioned as thermoplastics. Polymers which are mentioned are also those of butadiene, styrene and acrylonitrile or of styrene by itself. The plastics which can be foamed can contain phosphate esters as flameproofing agents, if appropriate in combination with halogen compounds. No polytetrafluoroethylene polymers are recommended as halogen compounds.

DE-OS (German Published Specification) 2,921,325 describes the addition of pentaerythritol diphosphates and diphosphonates as flameproofing agents for polycarbonates, it also being possible for halogen compounds additionally to be used, and according to U.S. Pat. Specification 3,392,136 cited on page 9 of DE-OS (German Published Specification) 2,921,325, these can also be polyvinylidene fluorides. ABS copolymers can be admixed to the polycarbonates.

Flame-retardant ABS polymers which contain polytetrafluoroethylenes are known, inter alia, from U.S. Pat. Specification 4,355,126 and 4,107,232. Triphenyl phosphate is the particularly preferred flameproofing agent.

Flame-retardant mixtures of polycarbonates, ABS polymers and halogen compounds are known from DE-OS (German Published Specification) 2,903,100 and 2,918,883. According to DE-OS (German Published Specification) 2,903,100, the flame-retardant properties are achieved by special organic sulphonates. Fluorinated polyolefins can be added as drip-inhibiting agents. According to DE-OS (German Published Specification) 2,918,883, the flame-retardant properties are achieved by alkali metal or alkaline earth metal salts of acids in combination with anti-drip agents, the ABS polymers making up only a maximum of 10% by weight, based on the total mixture.

Flame-retardant polymer mixtures which, in addition to polytetrafluoroethylenes and organic halogen compounds, contain polyphosphates with molecular weights $\overline{M}_w$ of 1,600 to 150,000 in amounts of 1 to 35% by weight are also known (European Patent A-0,103,230). However, the polycarbonates of these moulding compositions are predominantly built up from tetramethylated diphenols.

Flame-retardant thermoplastic moulding compositions which contain a. aromatic polycarbonates, b. SAN graft polymers, C. thermoplastic polymers, d. if appropriate halogen compounds, e. antimony trioxide, antimony carbonate, bismuth trioxide or bismuth carbonate and f. a fine-particled tetrafluoroethylene polymer, this being introduced into the moulding composition via an aqueous emulsion of the SAN graft polymer b. and, if appropriate, an aqueous emulsion of the thermoplastic polymer c., good surfaces of the moulding compositions thus being achieved, are known from DE-OS (German Published Specification) 3,322,260.

High impact strength flame-retardant moulding compositions based on siloxane-free polycarbonates, copolymers of optionally substituted styrene and (meth)a- crylonitrile, halogen-free phosphorus compounds and a tetrafluoroethylene polymer are known from German Patent Application P 35 23 316.8 (Le A 23 927).

In further development of these moulding compositions, it has now been found that these moulding compositions can be improved further in respect of their toughness, in particular their notched impact strength, if the polycarbonate component (A) consists of polydiorgano-siloxane-polycarbonate block copolymers or contains these.

The moulding compositions according to the invention are distinguished by a good notched impact strength and good flame-retardant properties, without containing the halogen compounds and metal compounds used in customary fireproofing technology.

Halogen-free polydiorganosiloxane-polycarbonate block copolymers of component (A) which are suitable according to the invention are those based on the halogen-free diphenols of the formula (II) and of the formula (IIa)

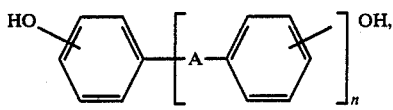

(II)

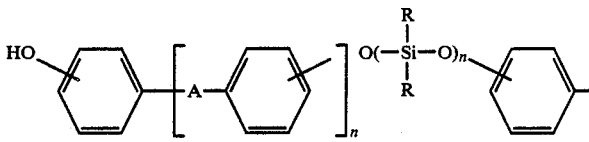

(IIa)

wherein
A is a single bond, $C_1$–$C_5$-alkylene, $C_2$–$C_5$-alkylidene, $C_5$–$C_6$-cycloalkylidene, —S— or —$SO_2$—,
n is 1 or zero,
the symbols R are identical or different and are linear $C_1$–$C_{20}$-alkyl, branched $C_3$–$C_{20}$-alkyl or $C_6$–$C_{20}$-aryl, preferably $CH_3$, and
m is an integer between 5 and 100, preferably between 20 and 80,
the weight content of diphenols of the formula (IIa) in the copolycarbonates in each case being such that the content of diorganosiloxy units

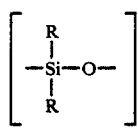

in the copolycarbonate (A) is between 1 and 25% by weight, preferably between 2.5 and 25% by weight.

Other siloxane-free thermoplastic halogen-free polycarbonates are preferably those which contain, as incorporated diphenols, only those of the formula (II).

In the cases where components (A) is a mixture of siloxane-containing polycarbonates and siloxane-free polycarbonates, the siloxane-containing polycarbonates can also have a content of diorganosiloxy units of more than 25% by weight, as long as mixing with the siloxane-free polycarbonates gives a content in the polycarbonate mixture of in turn between 1 and 25% by weight.

The halogen-free diphenols of the formula (II) are either known from the literature or can be prepared by processes which are known from the literature; polydiorganosiloxanes with hydroxyaryloxy end groups according to formula (Ia) are likewise known (see, for example, U.S. Pat. No. 3,419,634), or they can be prepared by processes which are known from the literature.

The preparation of the polycarbonates of component (A) which are suitable according to the invention is known from the literature and can be carried out, for example, with phosgene by the phase boundary process or with phosgene by the process in a homogeneous phase system (the so-called pyridine process), the molecular weight to be established in each case being achieved in a known manner by an appropriate amount of known chain stoppers. (In respect of polydiorganosiloxane-containing polycarbonates, see, for example, DE-OS (German Published Specification) 3,334,782 (Le A 22 594)).

Examples of suitable chain stoppers are phenol or p-tert.-butylphenol, and also long-chain alkylphenols such as 4-(1,3-tetramethyl-butyl)phenol according to DE-OS (German Published Specification) 2,842,005 (le A 19 006) or monoalkylphenols or dialkylphenols with a total of 8 to 20 C atoms in the alkyl substituents, according to German Patent Application P 35 06 472.2 (Le A 23 654), such as, for example, p-nonylphenol, 2,5-di-tert.-butylphenol, p-tert.-octylphenol, p-dodecylphenol, 2-(3,5-dimethylheptyl)-phenol and 4-(3,5-dimethylheptyl)-phenol. The amount of chain stoppers to be employed is in general between 0.5 and 10 mol %, based on the sum of the diphenols (II) and (IIa) employed in each case.

The polycarbonates of component (A) which are suitable according to the invention have mean weight-average molecular weights ($\overline{M}_w$, measured, for example, by ultracentrifugation or scattered light measurement) of 10,000 to 200,000, preferably 20,000 to 80,000.

Examples of suitable halogen-free diphenols of the formula (II) are hydroquinone, resorcinol, 4,4'-dihydroxydiphenyl, 2,2-bis-(4-hydroxyphenyl)-propane, 2,4-bis-(4-hydroxyphenyl)-2-methylbutane and 1,1-bis-(4-hydroxyphenyl)-cyclohexane.

Suitable diphenols of the formula (IIa) are those in which R is methyl, ethyl, propyl, n-butyl, tert.-butyl and phenyl.

Preferred halogen-free diphenols of the formula (IIa) are those of the formula (IIb)

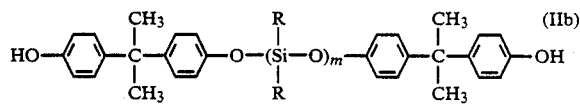

(IIb)

wherein
the symbols R are identical and have the abovementioned meaning, that is to say denote methyl and the like and phenyl, and m in turn is an integer between 5 and 100, preferably between 20 and 80.

The diphenols of the formula (IIa) can be prepared, for example, from the corresponding bi-chlorine compounds (III)

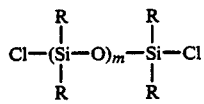

and the diphenols (II), for example in accordance with U.S. Pat. No. 3,419,634, column 3, in combination with U.S. Pat. No. 3,182,662.

In the bis-chlorine compounds (III), R and m have the meaning as for the diphenols (IIa) and (IIb).

The polycarbonates of component (A) which are suitable according to the invention can be branched in a known manner, and in particular preferably by incorporation of 0.05 to 2.0 mol %, based on the sum of the diphenols employed, of compounds which are trifunctional or more than trifunctional, for example those with three or more than three phenolic OH groups.

Preferred polydiorganosiloxane-polycarbonate block copolymers are copolycarbonates of the halogen-free diphenols of the formula (II) with diphenols of the formula (IIb).

Halogen-free thermoplastic copolymers of component (B) which are suitable according to the invention are resinous, thermoplastic and free from rubber. Particularly preferred polymers (B) are those of styrene and/or α-methylstyrene with acrylonitrile. By nuclear-substituted styrenes there are to be understood nuclear-alkylated styrenes, such as, for example, p-methylstyrene.

Particularly preferred weight ratios in the thermoplastic polymer (B) are 60 to 80% by weight of styrene, α-methylstyrene, nuclear-substituted styrene or mixtures thereof and 40 to 20% by weight of acrylonitrile.

The polymers of component (B) are known and can be prepared by free radical polymerization, in particular by emulsion, suspension, solution or bulk polymerization. The polymers of component (B) preferably have molecular weights $\overline{M}_w$ (weight-average, determined by light scattering or sedimentation) of between 15,000 and 200,000.

The halogen-free phosphorus compounds of component (C) which are suitable according to the invention are generally known (see, for example, Ullmann, Encyclopädie der technischen Chemie (Encyclopaedia of Industrial Chemistry), Volume 18, page 301 et seq., 1979; Houben-Weyl, Methoden der organischen Chemie (Methods of Organic Chemistry), Volume 12/1, page 43; and Beilstein, Volume 6, page 177).

Phosphorus compounds of component (C), formula (I), which are suitable according to the invention are, for example, triphenyl phosphate, tricresyl phosphate, diphenyl 2-ethylcresyl phosphate, tri-(isopropylphenyl) phosphate, diphenyl methylphosphonate or diethyl phenylphosphonate.

The tetrafluoroethylene polymers of component (D) which are suitable according to the invention are polymers with fluorine contents of 65 to 76% by weight, preferably 70 to 76% by weight. Examples are polytetrafluoroethylene, tetrafluoroethylene-hexafluoropropylene copolymers and tetrafluoroethylene copolymers with small amounts of fluorine-free copolymerizable ethylenically unsaturated monomers.

These polymers are known. They can be prepared by known processes, thus, for example, by polymerization of tetrafluoroethylene in an aqueous medium with a catalyst which forms free radicals, for example sodium peroxy disulphate, potassium peroxy disulphate or ammonium peroxy disulphate, under pressures of 7 to 71 kg/cm$^2$ and at temperatures of 0° to 200° C., preferably at temperatures of 20° to 100° C. (U.S. Pat. No. 2,393,967). The density of these materials is preferably in the range from 2.0 to 2.3 g/cm$^3$, and the particle sizes are preferably in the range from 100 to 1,000 μm.

In particular, dripping of the moulding composition melt during the burning process is reduced or completely prevented by the addition of tetrafluoroethylene polymers.

The thermoplastic moulding compositions according to the invention can contain other additives which are known for polycarbonates or for the thermoplastic polymers, such as stabilizers, pigments, flow control agents, mould release agents and/or antistatics.

The moulding compositions according to the invention consisting of components (A), (B), (C) and (D) and if appropriate other known additives, such as stabilizers, pigments, flow control agents, mould release agents and/or antistatics, are prepared by mixing the particular constituents in a known manner and subjecting the mixture to melt compounding or melt extrusion at temperatures of 200° to 330° C. in customary units, such as internal kneaders or single- and twin-screw extruders, or by mixing solutions of the particular components in suitable organic solvents, for example in chlorobenzene, and evaporating the solution mixtures in customary units, for example in devolatilization extruders.

The present invention thus also relates to a process for the preparation of thermoplastic moulding compositions consisting of components (A), (B), (C) and (D) and, if appropriate, stabilizers, pigments, flow control agents, mould release agents and/or antistatics, which is characterized in that components (A), (B), (C) and (D) and, if appropriate, stabilizers, pigments, flow control agents, mould release agents and/or antistatics, after being mixed, are subjected to melt compounding or melt extrusion at temperatures of 200° to 330° C. in customary units, or in that solutions of these components in suitable organic solvents, after being mixed, are evaporated in customary units.

The moulding compositions of the present invention can be used to produce all types of mouldings. In particular, mouldings can be produced by injection moulding. Examples of mouldings which can be produced are all types of housing components (for example for domestic appliances, such as coffee machines or mixers) or cover plates for the building sector and components for the motor vehicle sector. They are also used in the field of electrical engineering, because they have very good electrical properties.

Another form of processing is the production of mouldings by deep-drawing or thermoforming of sheets or foils produced beforehand by extrusion.

Particle size always denotes average particle diameter d$_{50}$, determined by ultracentrifuge measurements in accordance with the method of W. Scholtan et al., Kolloid-Z, u. Z. Polymere 250 (1972) 782 to 796.

EXAMPLES

Blend components employed

A. 1. A copolycarbonate based on bisphenol A and 5% by weight of polydimethylsiloxane of block length ($\bar{P}_n$) 40 with a relative solution viscosity of 1.31, measured in $CH_2Cl_2$ at 25° C., and at a concentration of 0.5% by weight, prepared using phenol as the chain stopper, according to DE-OS (German Published Specification) 3,334,782.

A. 2. Homopolycarbonate based on bisphenol A with a relative solution viscosity of 1.32, measured in $CH_2Cl_2$ at 25° C. and at a concentration of 0.5% by weight, prepared using phenol as the chain stopper.

B. Styrene/acrylonitrile copolymer with a styrene/acrylonitrile ratio of 72:28 and a limiting viscosity of $(\eta)=0.55$ dl/g (measured in dimethylformamide at 20° C.).

C. Triphenyl phosphate

D. Tetrafluoroethylene polymer in powder form with a particle size of 500 to 650 $\mu$m and a density of 2.18 to 2.20 g/cm$^3$, from Hoechst (Hostaflon TF 2026).

Preparation of the moulding compositions according to the invention

Components (A), (B), (C) and (D) were compounded on a 3 liter internal kneader at temperatures between 200° and 220° C.

Mouldings were produced on an injection moulding machine at 260° C.

The burning properties of the samples were measured in accordance with UL-Subj. 94 V in test specimen thicknesses of 1.6 mm and 3.2 mm. The UL-94 test is carried out as follows:

Samples of substance are moulded to bars with dimensions of 127×12.7×1.6 mm and 127×12.7×3.2 mm. The bars are mounted vertically so that the underside of the sample specimen is 305 mm above a strip of bandaging material. Each sample bar is ignited individually by means of two successive ignition operations lasting 10 seconds; the burning properties after each ignition operation are observed and the sample is evaluated accordingly. A Bunsen burner with a 10 mm (3.8 inches) high blue flame of natural gas with a thermal unit of 3.73×10$^4$ kJ/m$^3$ (1000 BTU per cubic foot) is used to ignite the sample.

The UL-94 V-0 classification comprises the properties described below for materials which have been tested in accordance with the UL-94 specification. The polycarbonate moulding compositions in this class contain no samples which burn for longer than 10 seconds after each action of the test flame; they exhibit no total flaming time of more than 50 seconds with the two flaming actions on each set of samples; they contain no samples which burn completely up to the holding clamp attached to the top end of the sample; they contain no samples which ignite cottonwool arranged below the sample by burning drips or particles; they also contain no samples which glow for longer than 30 seconds after the test flame is removed.

Other UL-94 classifications describe samples which are less flame-retardant and self-extinguishing and which release flaming drips or particles. These classifications are designated UL-94 V-1 and V-2. F means "failed" and is the classification of samples which have an after-burn time of $\geq$30 seconds.

The notched impact strength was determined in accordance with the method of DIN 53 453/ISO R 179 on bars with dimensions of 50×6×4 mm, the bars being given a V-shaped notch of notch depth 2.7 mm, and by the Izod method on bars with dimensions of 2.5×½×⅛ in accordance with ASTM-D-256. The precise formulations of the moulding compositions tested and the test data obtained can be seen from the following table.

It can be seen that when polydiorganosiloxanepolycarbonate block copolymers are used instead of polycarbonate, products with clearly improved notched impact strength and still with excellent flame-retardant properties result.

TABLE

| Example No. | Components A1 | A2 | B | C | D | Notched impact strength DIN 53 453 (kJ/m$^2$) | Izod (J/m) | UL-94 V 3.2 mm | 1.6 mm |
|---|---|---|---|---|---|---|---|---|---|
| | (parts by weight) | | | | | | | | |
| Examples according to the invention | | | | | | | | | |
| 1 | 80 | | 20 | 10 | 0.3 | 8.6 | 234 | VO | VO |
| 2 | 70 | | 30 | 10 | 0.3 | 6.6 | 106 | VI | VI |
| Comparison Examples | | | | | | | | | |
| 3 | | 80 | 20 | 10 | 0.3 | 6.7 | 72 | VO | VO |
| 4 | | 70 | 30 | 10 | 0.3 | 5.8 | 62 | VI | VI |

We claim:

1. A thermoplastic moulding composition comprising (A) 60 to 90 parts by weight of a halogen-free polydiorgano-siloxane-polycarbonate block copolymer with an average molecular weight $\bar{M}_w$ of 10,000 to 200,000 and with a content of aromatic carbonate structural units of between 75 and 99% by weight and a content of diorganosiloxane units of between 25 and 1.0% by weight, the block copolymer being prepared from halogen free diphenols of the formula (II) and of the formula (IIa)

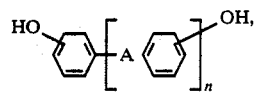  (II)

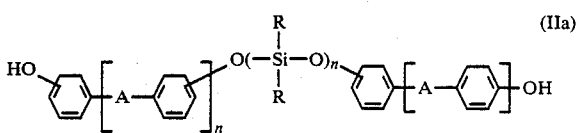  (IIa)

wherein
A is a single bond, C$_1$–C$_5$-alkylene, C$_2$–C$_5$-alkylidene, C$_5$–C$_6$-cycloalkylidene, —S— or —SO$_2$—,
n is 1 or zero,
the symbols R are identical or different and are linear C$_1$–C$_{20}$-alkyl, branched C$_3$–C$_{20}$-alkyl or C$_6$–C$_{20}$-aryl, and
m is an integer between 5 and 100, or a mixture of such a block copolymer with another siloxane-free thermoplastic halogen-free polycarbonate prepared only from diphenols of the formula (II), the content of diorganosiloxane units in said mixture being between 25 and 1.0% by weight, (B) 10 to 40 parts by weight of a halogen-free thermoplastic copolymer of 50 to 95% by weight of styrene, α-methylstyrene, nuclear-substituted styrene or a mixture thereof and 5 to 50% by weight of (meth)acrylonitrile, (C) 1 to 20 parts be weight per 100 parts by weight of the total weight of (A) and (B), of a halogen-free phosphorus compounds of the general formula

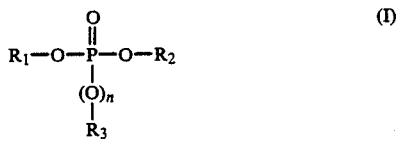

wherein $R_1$, $R_2$ and $R_3$ independently or one another are $C_1$–$C_8$-alkyl or optionally alkyl-substituted $C_6$–$C_{20}$-aryl and n is 0 or 1, and (D) 0.05 to 5 parts by weight, again per 100 parts by weight of the total weight of (A) and (B), of a tetrafluoroethylene polymer with a density of 2.0 to 2.3 g/cm$^3$ and a particle size of 100 to 1,000 μm.

2. A moulding composition according to claim 1, in which the block copolymer of component (A) has a content of aromatic carbonate structural units of between 75 and 97.5% by weight.

3. A moulding composition according to claim 1, in which the block copolymer of component (A) or the mixture has a total content of diorganosiloxy units of between 2.5 and 25% by weight.

4. A moulding composition according to claim 1, in which the block copolymer of component (A) has a degree of polymerization $\overline{P}_n$ of 20 to 80.

5. A moulding composition according to claim 1, in which the copolymer of component (B) is a copolymer of styrene and/or α-methylstyrene with acrylonitrile.

6. A moulding composition according to claim 1, in which the copolymer of component (B) comprises 60 to 80% by weight of styrene, α-methylstyrene, nuclear-substituted styrene or a mixture thereof and 40 to 20% by weight of acrylonitrile.

7. A moulding composition according to claim 1, in which the compound of component (C) is used in an amount of 2 to 15 parts by weight per 100 parts by weight of (A) and (B).

8. A moulding composition according to claim 1, in which the compound of component (C) is triphenyl phosphate, tricresyl phosphate, diphenyl 2-ethylcresyl phosphate, tri-(isopropylphenyl) phosphate, diphenyl methylphosphonate or diethyl phenyl-phosphonate.

9. A moulding composition according to claim 1, in which the tetrafluorethylene polymer of component (D) is used in amounts of 0.1 to 2.0 parts by weight per 100 parts by weight of (A) and (B).

10. A moulding composition according to claim 1, in which the polymer of component (D) is a polymer with a fluorine content of 65 to 76% by weight.

11. A moulding composition according to claim 1, in which the polymer of component (D) is selected from polytetrafluoroethylene, tetrafluoroethylene-hexafluororopylene copolymers and tetrafluoroethylene copolymers with a relatively small amount of fluorine-free copolymerizable ethylenically unsaturated monomers.

12. A moulding composition according to claim 1, containing at least one additive selected from stabilizers, pigments, flow control agents, mould release agents and antistatics.

13. A process for the production of a moulding composition according to claim 1, in which components (A) to (D) are mixed and the mixture is then subjected to melt compounding or melt extrusion at a temperature of 200° to 330° C. in a melt compounding or melt extrusion unit.

14. A process for the production of a moulding composition according to claim 1 in which a solution of components (A) and (D) in an organic solvent suitable therefor is mixed and the solution mixture is then evaporated in a devolatilization unit.

15. A process for the production of a moulding composition in which the process of claim 13 is carried out with the incorporation of at least one additive selected from stabilizers, pigments, flow control agents, mould release agents and antistatics in the mixture.

16. A moulding composition according to claim 1 wherein component (D) has a particles size of 500 to 650 μm and a density of about 2.18 to 2.20 g/cm$^3$.

17. A moulding composition according to claim 1 wherein component (D) has a fluorine content of about 70 to 76% by weight.

* * * * *